United States Patent [19]

D'Ausilio

[11] Patent Number: 4,726,224
[45] Date of Patent: Feb. 23, 1988

[54] SYSTEM FOR TESTING SPACE WEAPONS

[76] Inventor: Robert F. D'Ausilio, 16354 Grayville Dr., La Mirada, Calif. 90638

[21] Appl. No.: 832,450

[22] Filed: Feb. 24, 1986

[51] Int. Cl.$^4$ .......................... B64G 1/10; G01L 5/14; H04B 7/185

[52] U.S. Cl. .................................... 73/167; 244/3.15; 340/686

[58] Field of Search .................. 73/167; 244/3.15, 3.1

[56] References Cited

U.S. PATENT DOCUMENTS

| | | | |
|---|---|---|---|
| 3,960,000 | 6/1976 | Barnett et al. | 73/167 X |
| 4,155,647 | 6/1979 | Michel | 73/167 |
| 4,174,819 | 11/1979 | Bruderle et al. | 244/176 X |
| 4,300,389 | 11/1981 | Tevelow | 73/167 |
| 4,358,076 | 11/1982 | Lange et al. | 244/176 X |

Primary Examiner—Daniel M. Yasich
Attorney, Agent, or Firm—William H. Drummond

[57] ABSTRACT

A system for testing space weapons includes a weapons platform and at least one target which are positioned in space, means for precisely determining the positions of the weapon and the target both with and without the cooperation of the target, a control and assessment system for receiving and processing weapon and target status and position data, generating command signals to the weapon and for generating, displaying and assessing weapon effectiveness data and a data communication system for maintaining communications between and among the weapon platform, the target and the test control assessment system.

1 Claim, 11 Drawing Figures

▼ 93% COVERAGE AT 300 MILES

SYSTEM FOR TESTING SPACE WEAPONS

This invention relates to a system for testing weapon technologies, weapons and weapon systems in space.

More particularly, the invention concerns systems for testing weapon technology, weapons and weapons systems which are specially adapted to engage and destroy or render ineffective various space-located military targets such as orbiting earth-surveillance, communications and similar satelites, opposing space-to-space and space-to-earth weapons systems in space orbit or other space trajectories, manned and unmanned space vehicles and the like.

In still another more particular respect, the invention pertains to systems for testing space weapons at a plurality of advancing stages of development, in which the in-space test system hardware can be modified, supplemented, repaired or otherwise reconfigured to meet changing test requirements as the weapons development project advances to completion and final testing.

In still another important respect the invention pertains to a space weapons testing system in which such reconfiguration, etc , can be accomplished without returning the major components of the system to earth.

GLOSSARY OF ACRONYMS

As used herein, the acronyms listed below are adopted and have the indicated meanings:
  GPS: Global Positioning System
  Glomar: Global message relay
  RCS: Reaction Control System
  KGW-KEW: Kenintic Energy Weapon
  DWG-DEW: Directed Energy Weapon
  NPB: Neutral Partical Beam
  ACS: Attitude Control System
  STS: Space Transportation System
  MMS: Multi Mission Satellite
  C&DH: Communication and Data Handling
  GPS-REC: Global Position System-Receiver
  SDI: Strategic Defense Initiative
  TDRS: Tracking and Data Relay Satellite
  KKV: Kenintic Kill Vehicle According to the recently proposed Strategic Defense Initiative (SDI) various weapons and other systems are under investigation and development to provide defenses against opposing earth-to-space, space-to-space and space-to-earth weapons systems, surveillance systems and the like.

In still another important respect the invention allows for the testing of weapon systems in space by a virtual targeting mode.

The basic functions of the defense systems under investigation in connection with the SDI are the detection of threat of attack or other undesirable opposing activity, acquisition and tracking of the threat to locate it in time and space, identification of the threat and discrimination against decoys to permit efficient allocation of defense resources, interception and destruction of the threat and assessment of the results of the engagement. Inherent in these functions is assessment of weapon counter-measures.

The present invention is directed to systems for testing hardware, software and other components which would be useful primarily in carrying out the intercept-destruct function, the assessment function and counter-measures function. The primary thrust of the present invention is the provision of a test range for verification of evolving technologies relating to space weapons to measure their performance in a true space environment with minimum risk, cost and with great accuracy. Such weapons may include both chemically and electromagnetically launched -Kinetic Kill Vehicle (KKV) weapons and Directed Energy Weapons (DEW) systems such as chemical and free energy lasers, excimer lasers, neutral particle beams, X-ray lasers and the like.

A test system for measuring the effectiveness of such space weapons must posses a wide variety of capabilities, including transfer of the space weapon from an earth-launch vehicle to its space test position(s), long duration continuous coverage of the space tests being performed, supplying targets which can be economically deployed and which have capabilities for testing the survivability and/or vulnerability of various materials and systems, the accurate location of these targets, accurate pointing of the test weapons and the assessment of kill attempts, etc. At present, no such space weapons testing systems have been provided or proposed which provide all of these capabilities and the cost and time to develop such test systems are critical limiting factors in the developing of the weapons themselves.

It would also be highly desirable if such a weapons testing system could be provided which has the built in capability to be modified, supplemented or otherwise reconfigured in space such that modifications and additions to the test program could be accomplished without returning major components of the test apparatus to earth. It would also be highly desirable to provide such a test system which has the capability of testing weapons and weapons systems at various points in the evolutionary development of the weapon so as to provide quiescent test conditions in the early stages of development and simulation of actual "battle" conditions at the point of final development of the weapon. It would also be highly desirable to provide a weapons test system in which the weapon platform and weapon are retrievable by an earth-launch vehicle, repairable and reusable. Finally, to reduce the cost and time for construction of the test system, it would be highly desirable to provide a system which essentially utilizes hardware and other elements which are already available, tested and flight proven.

Accordingly, the principal object of the present invention is to provide a test system for testing space weapon technologies, weapons and space weapon systems.

Yet another object of the invention is to provide such a test system which can be rapidly constructed and operated at a relatively low cost.

Still another and further object of the invention is to provide a space weapons testing system which can be easily modified or reconfigured to allow for testing of space weapons during the evolutionary development of such weapons from the R & D stage to the operational stage.

Still another and further object of the invention is to provide a space weapons test system which is capable of multi-mode operation such that it can test proposed space weapons with both cooperative and non-cooperative targets, which can provide independent calibrations and measurements of the weapons components and systems and the effects thereof and which can provide functional weapons effects simulation.

Still another, further and more specific object of the invention is to provide a weapons test system which yields precision pointing and position data for the weapon and the targets.

Yet another object is to provide a virtual target capability which yields non-destructive space testing and elimination of space debris.

Yet another object is to provide a space weapons test system which utilizes a weapons test platform which is retrievable and repairable in space and reusable for other or modified weapons.

Yet another object of the invention is to provide a weapons test system, many of the major components of which are already in existence and can be used directly or with only minor modification.

These and other, further and more specific objects and advantages of the invention will be apparent to those skilled in the art from the following detailed description thereof, taken in conjunction with the drawings, in which.

Figure 1:
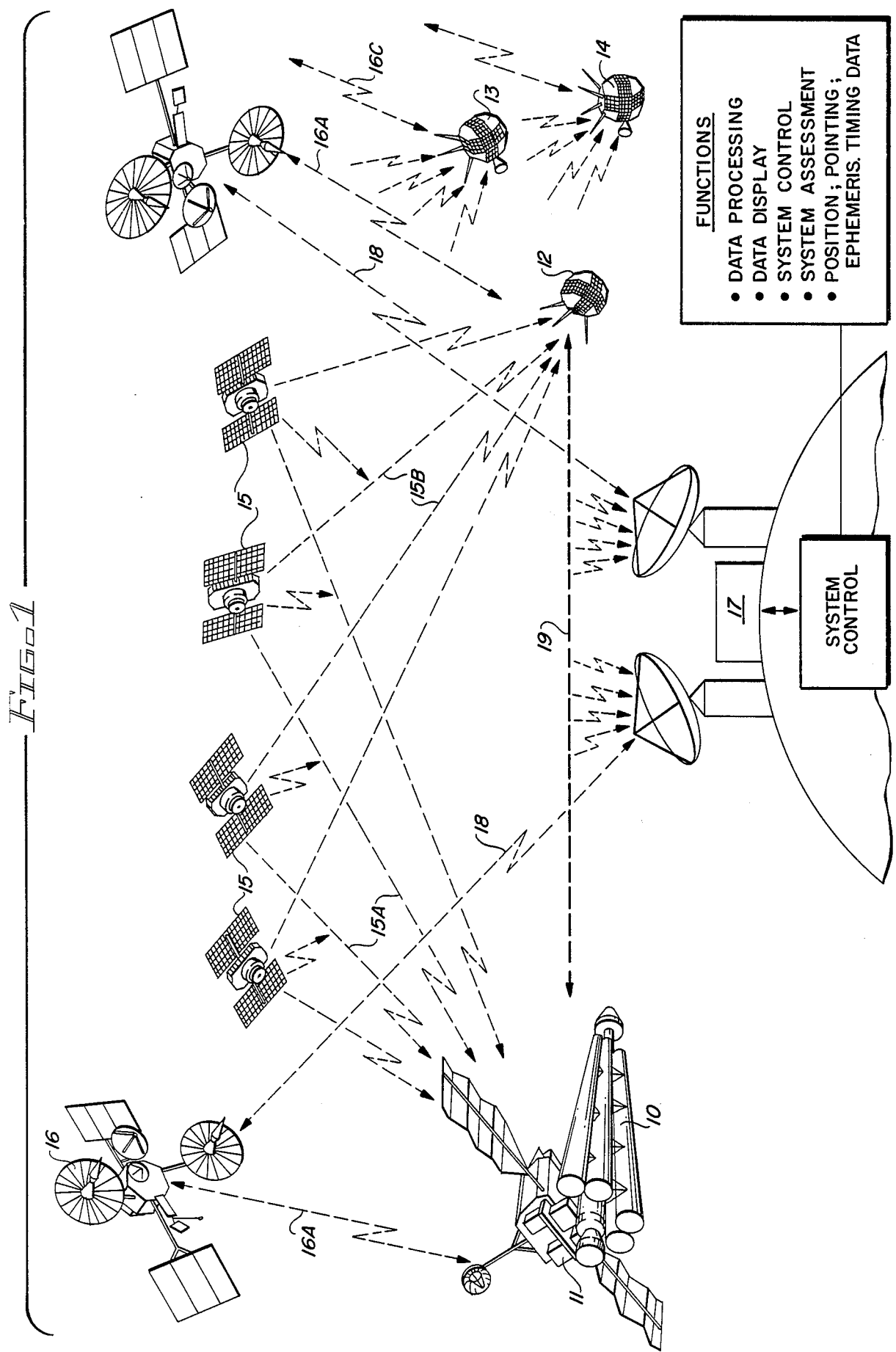
FIG. 1 shows the major components of the test system of the present invention and their interrelationships according to the presently preferred embodiment of the invention.

It will be understood that the specifics of the hardware illustrated in the drawings are non-limiting and that the drawings merely depict a system embodying the present invention for purposes of illustration and to identify the presently preferred embodiments of the invention.

Briefly, in accordance with the invention I provide a system for testing weapons in space. The system includes, as major components, a weapons platform, a target, a weapon/target position determination system, a test control/assessment system and a data communication system.

The weapons platform includes means for supporting and carrying the space weapon to be tested and housekeeping subsystems including propulsion, support, power, communications and command subsystems. The command subsystem can include provisions for positioning and pointing the weapon.

The target can be real or virtual and includes means for positioning the target in space remote from the weapons platform, damage assessment sensors and means for communicating damage assessment data and, selectably, target position data. The target can be real or virtual.

The weapon/target position determination system operates in at least two modes. Means are provided, according to a first mode of operation, for determining the positions of the weapons platform and the target using target position data supplied by the target communication system. According to a second mode of operation, means are provided for determining the positions of the weapons platform and the target independently of such supplied target position data.

The test control/assessment system includes means for processing weapon status data, target status data and weapon/target position data, means for generating command signals including position, pointing, energy and timing signals and means for generating weapon-effectiveness data and for displaying and assessing such data.

The data communication system includes means for receiving data transmitted by the weapon/target position determination system, the weapons platform communication system and target communications subsystems and relaying such data to the test control/assessment system and means for receiving command signals from the test control/assessment system and means for relaying said commands to said weapons platform.

Turning now to the drawings, FIG. 1 illustrates the overall system of the present invention and shows the major components thereof positioned in space relative to the earth. The SDI weapon 10 under test is carried by a space-platform 11. A target satelite 12 is provided and, optionally, surveillance satelites 13 and 14 are positioned near the target. The relative positions of the weapon 10 and the target 12 are continuously determined by an array of global positioning satelites 15 and the ground terminal facility 17. Data relay satelites 16 are provided which communicate directly with a ground terminal facility 17. Position and pointing data is obtained by signals transmitted from the GPS satelites 15 to the weapon platform 11 as indicated by dashed lines 15a, the ground station 17 and, optionally, to the target 12 as indicated by dashed lines 15b. Target and weapons platform position and status data is transmitted to the data relay satelites 16 as indicated by dashed lines 16a and 16b. The position and status data is relayed from the satelites 16 to the ground terminal facility 17 and, in turn, command signals 18 are relayed via the relay satelites 16 from the ground terminal facility 17 to the weapons platform 11, target 12 and surveillance satelites 13 and 14 via the communications links 16a, 16b and 16c.

The ground terminal facility 17 performs the functions of data processing, data display, system control, system assessment and the generation of position, pointing, energy and timing data signals. Tracking and acquisition signals between the weapons platform 11 and target 12 are indicated by the dashed line 19.

The major components of the system of FIG. 1 are either currently available or are readily obtainable utilizing existing technology. For example, the weapons platform 11 can be constructed by the addition of suitable subsystems to the Satelite Transfer Vehicle which is disclosed in co-pending application Ser. No. 645,911 filed Aug. 29, 1984 entitled Satelite Transfer Vehicle.

The functions of data relay satelites 16 can be performed by TDRS satelites in geosynchronous orbit which provide continuous on-orbit space test coverage at most attitudes. Because of this continuous coverage the TDRS also provides command, control and data relay capability. The GPS satelites when used in a different mode with the ground station, platform, targets and sensor vehicles provides precision positional and pointing data. The Glomar is an inexpensive satelite modified with an RCS system capability which can be used as an expendable on-orbit target vehicle, in either a destructive or non-destructive configuration. The Glomar is also used to carry measurement instrumentation. The ground station 17 receives data through the TDRS (or directly from any of the other space assets (when made in lieu of the subsystems of the ground station)) transmits commands, provides inter-satelite communications and performs the data processing and GPS positioning functions.

Figure 2:
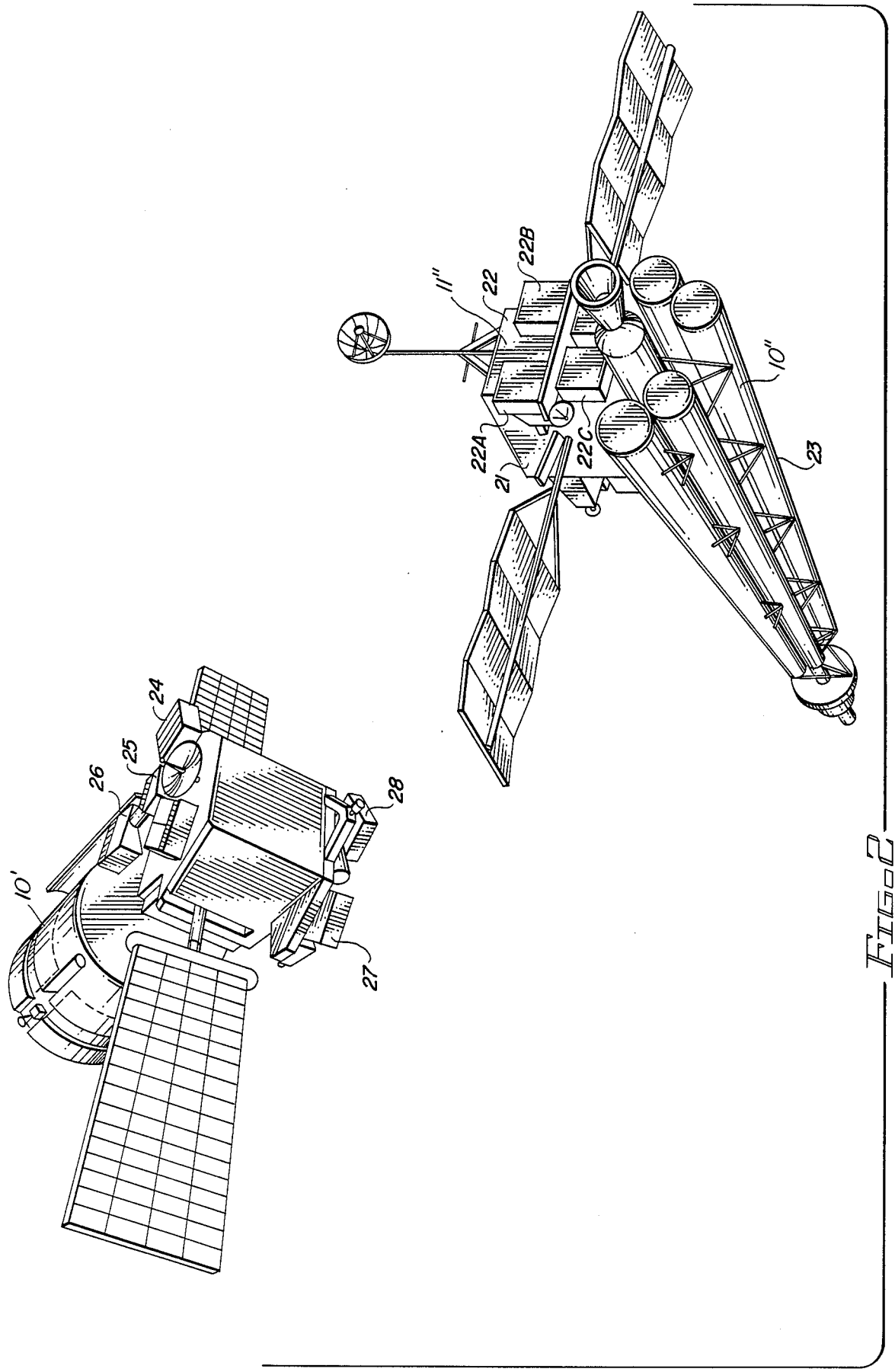
FIG. 2 is a perspective view of the weapons platform of FIG. 1, carrying a hypothetical space weapon.

FIG. 2 depicts the weapons platform of FIG. 1 in greater detail. The platform consists of a propulsion and housekeeping systems module 21 which carries a weapons support module 22 with the space weapon 23 mounted thereon. The space weapon 23 may, for example, be a laser, KGW or DGW, NPB, charged particle beam, microwave or similar weapon.

The weapons platform provides a spacecraft bus to carry the weapon experiment into the test orbit. This bus is modular, with each module capable of on-orbit servicing, refueling and maintenance. Thus, the weapons support module 22 is provided with a plurality of subsystem modules 22a, 22b and 22c which can be attached and detached in space to provide for on-orbit refueling, modification or repair. For example, such modules may include ACS 24, weapon interface 25 auxiliary power 26, specialized antennas 27 and other weapons support modules 28.

Figure 3:
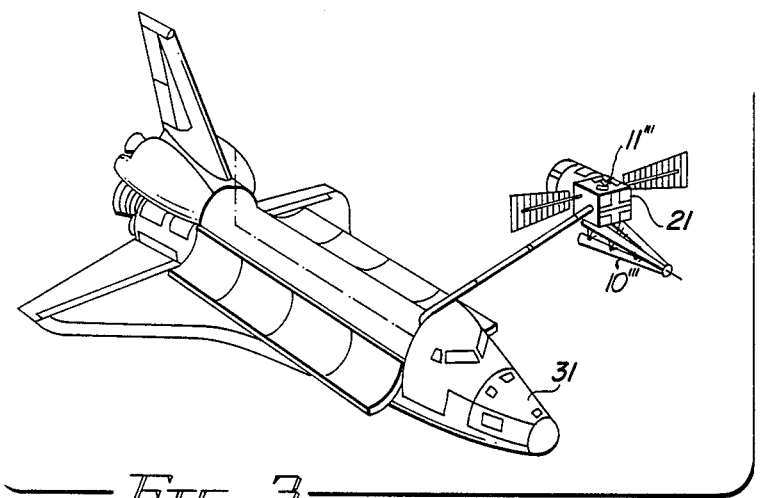
FIG. 3 illustrates the deployment of the platform-weapon components from the Space Transportation System (STS) vehicle.

FIG. 3 shows the STS 31 with the weapon platform 21 being deployed. The platform is retrieved in a similar manner for maintenance, servicing or refueling in orbit. The platform 21 is also capable of being launched on an expendable launch vehicle such as the Titan 34B booster.

Figure 4:
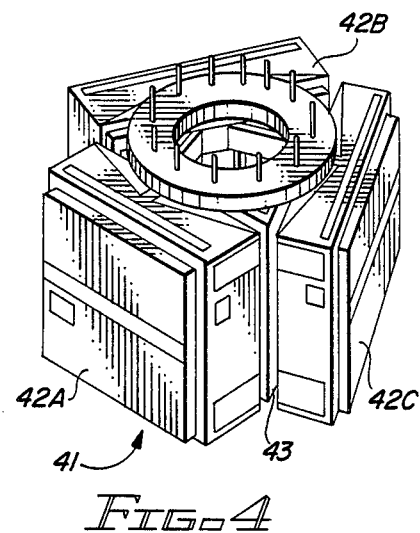
FIG. 4 illustrates the modular construction of the weapon platform of FIGS. 2-3 and illustrates the use of replacement component modules which permit in-space modification, reconfiguration and/or repair of the weapons platform.

FIG. 4 shows an exploded view of the multi-mission satelite 41 ("MMS"). The MMS has flown on three missions and several modules 42 were used on the recent "Solar Max" mission which demonstrated its capability to be maintained on orbit and being recovered to the STS. For example, the module support structure 43 can carry an ACS module 42a, a payload interface module 42b and a C&DH module 42c.

Figure 5A:
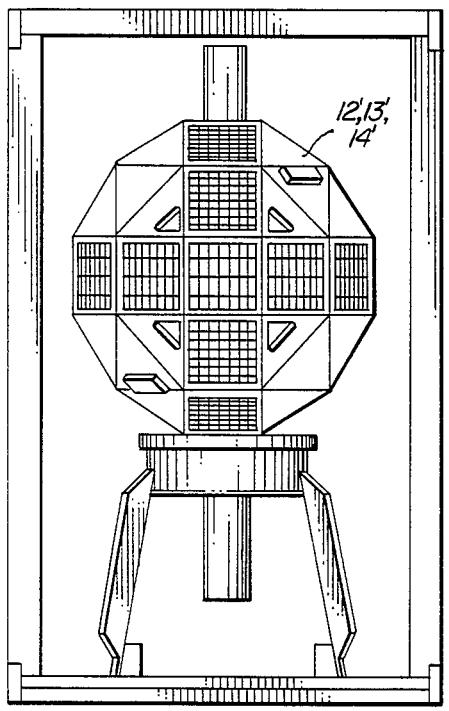
FIG. 5A illustrates a space vehicle which is used as a target or surveillance platform.
Figure 5B:
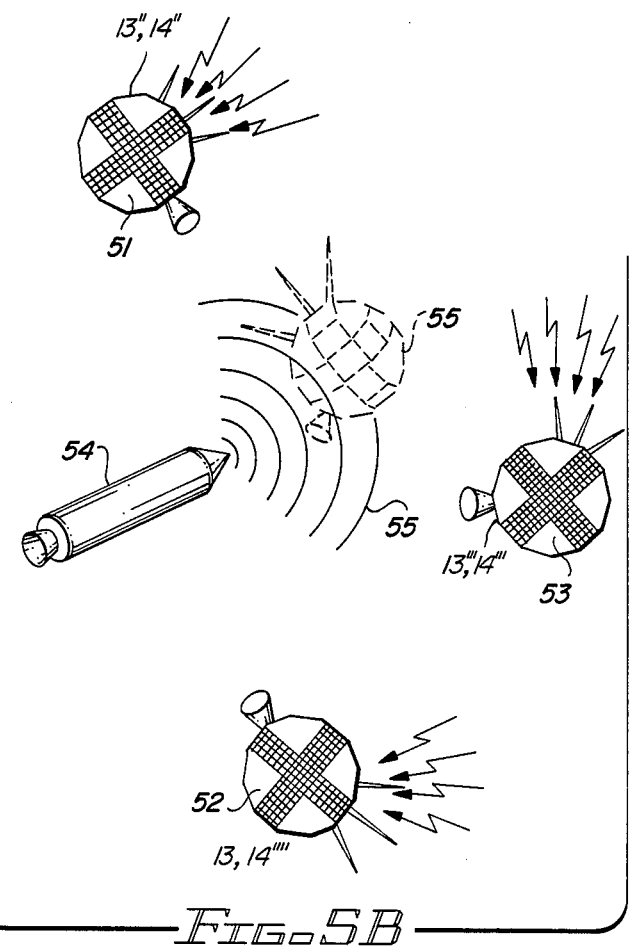
FIG. 5B illustrates a virtual target or surveillance platform configuration.

FIG. 5A depicts a small, inexpensive, space-proven satelite known as "GLOMAR" which has actually been flown twice on the STS. This satelite can be used as a direct target in the system of the present invention or as a virtual target as shown in FIG. 5B. The basic satelite system of FIG. 5A lends itself to carrying test measurement instrumentation. The satelites are modified with small GPS-REC for various test configurations.

As shown in FIG. 5B, the satelites 51, 52 and 53 of FIG. 5A are positioned with the GPS constellation and the Ground Station in the differenced GPS mode. The weapon 54 is designed to emit a signal 55 for nuclear energy which is detected by the test satelites 51, 52 and 53. The hit or miss distance from the virtual target 55 is then determined by detecting the radiated energy, knowing the precise position of each of the test satelites.

Figure 6A:
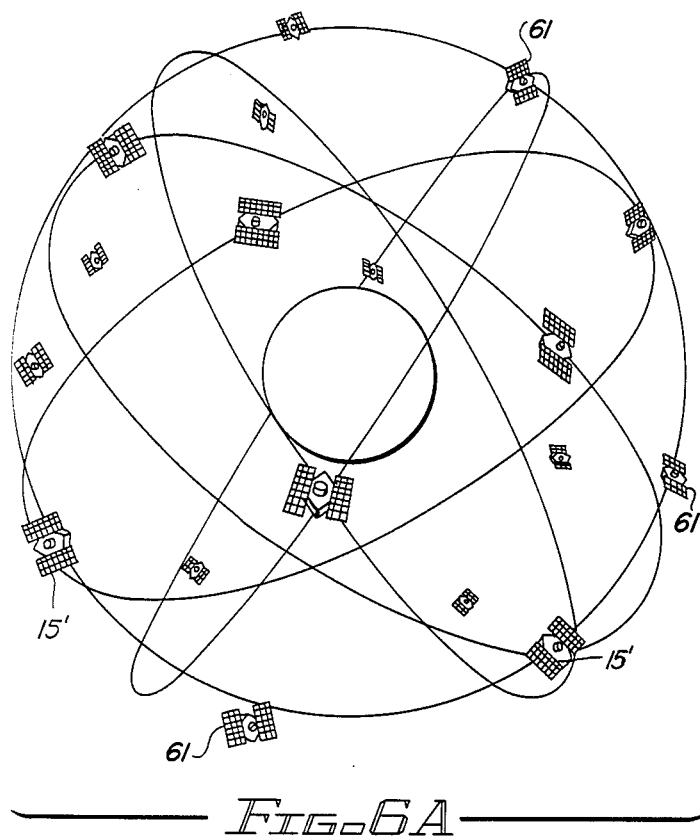
FIG. 6A illustrates an array of position-fixing satelites used in the system of FIG. 1.

FIG. 6 shows the final constellation of the Global Positioning System (GPS). Currently seven satelites 61 are in orbit and by the end of 1988 eighteen additional satelites will be in orbit. The GPS positional data has two major sources of error which is reduced by the system of the present invention.

A 10-meter error is caused by the positional uncertainty of the GPS satelites 61 and the other error is an approximate 2-meter error caused by clock differences. Since the Ground Station provides a well-known reference and common links to the space vehicles, the error can be reduced to the centimeter range.

Figure 6B:
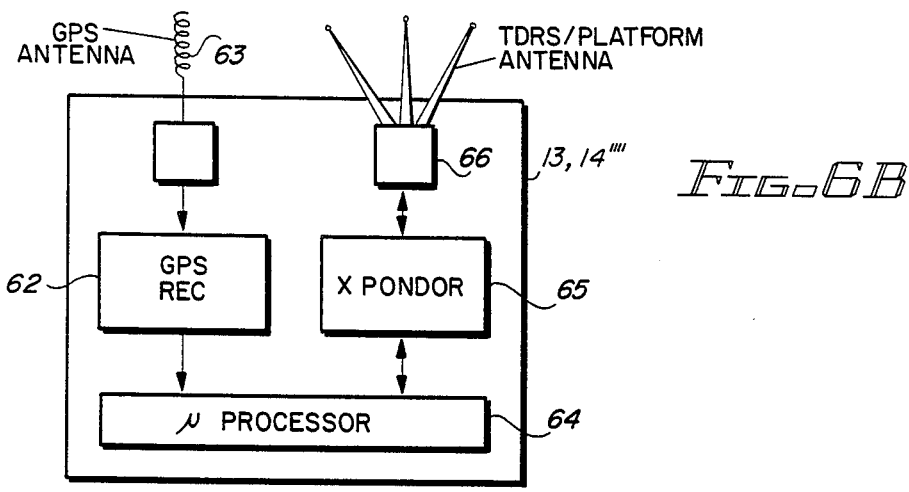
FIG. 6B illustrates the module configuration which is added to each space vehicle element to determine position and pointing information and provide inter-vehicle communications.

FIG. 6B shows the module which must be added to each of the platform vehicles 11 of FIG. 1. The module consists of a GPS receiver 62 provided with an antenna 63 and a communications system including a microprocessor 64, transpondor 65 and TDRS antenna 66. This module determines positional and attitude data and receives and transmits to the other space components of the system.

Figure 7B:
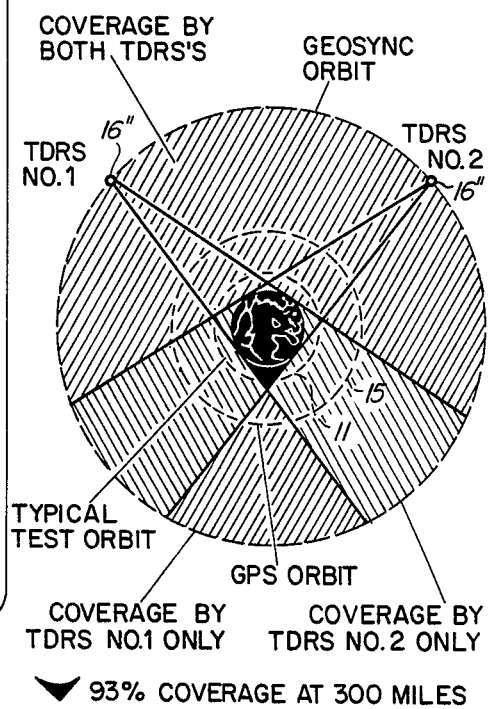
FIG. 7B illustrates the continuous coverage capability of the TDAS.
Figure 7A:
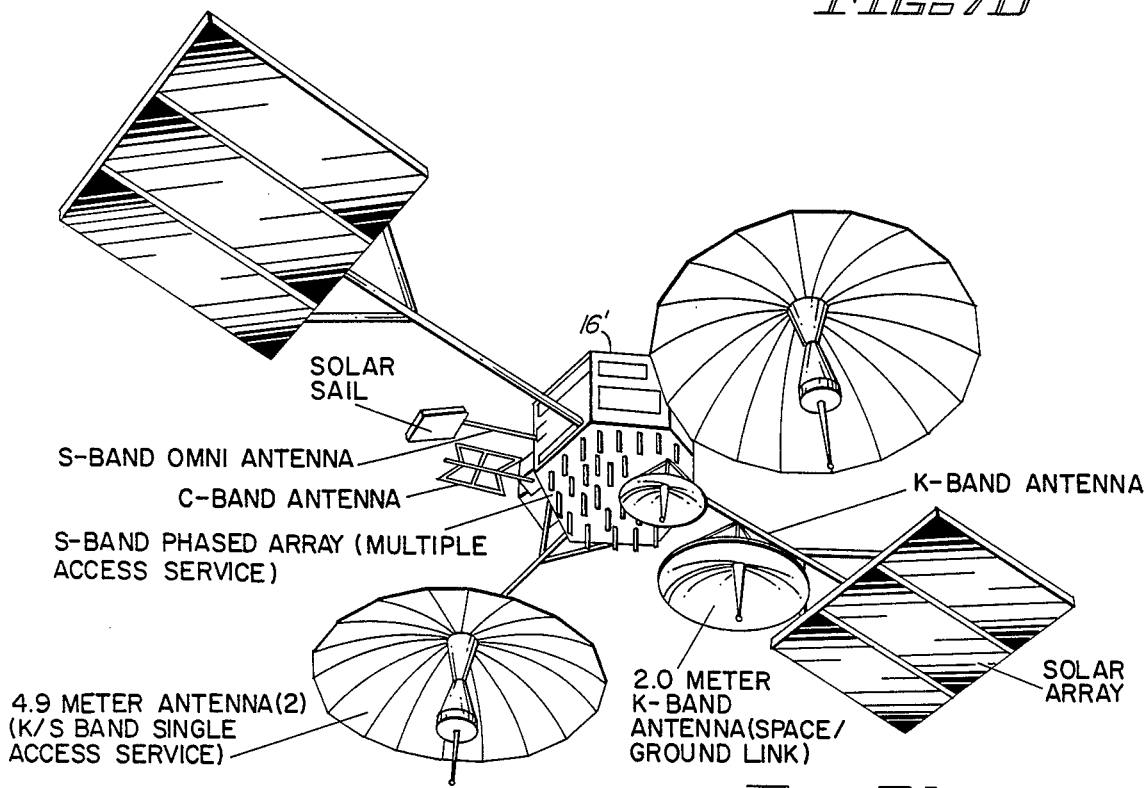
FIG. 7A illustrates a tracking and data relay satelite used in the system of FIG. 1.

FIG. 7A depicts the well-known TDRS satelite which is at geosynchronous orbit. Because of its orbit advantage, using a relay satelite such as TDRS provides long-duration continuous coverage of a space test conducted in orbit. Without a relay satelite the test would be limited to days.

FIG. 7B depicts coverage of the existing TDRS A satelite and the increased coverage of TDRS B. The coverage ranges from a worst case 93% at a test orbit of 300 miles to 100% depending on orbit inclination.

Figure 8:
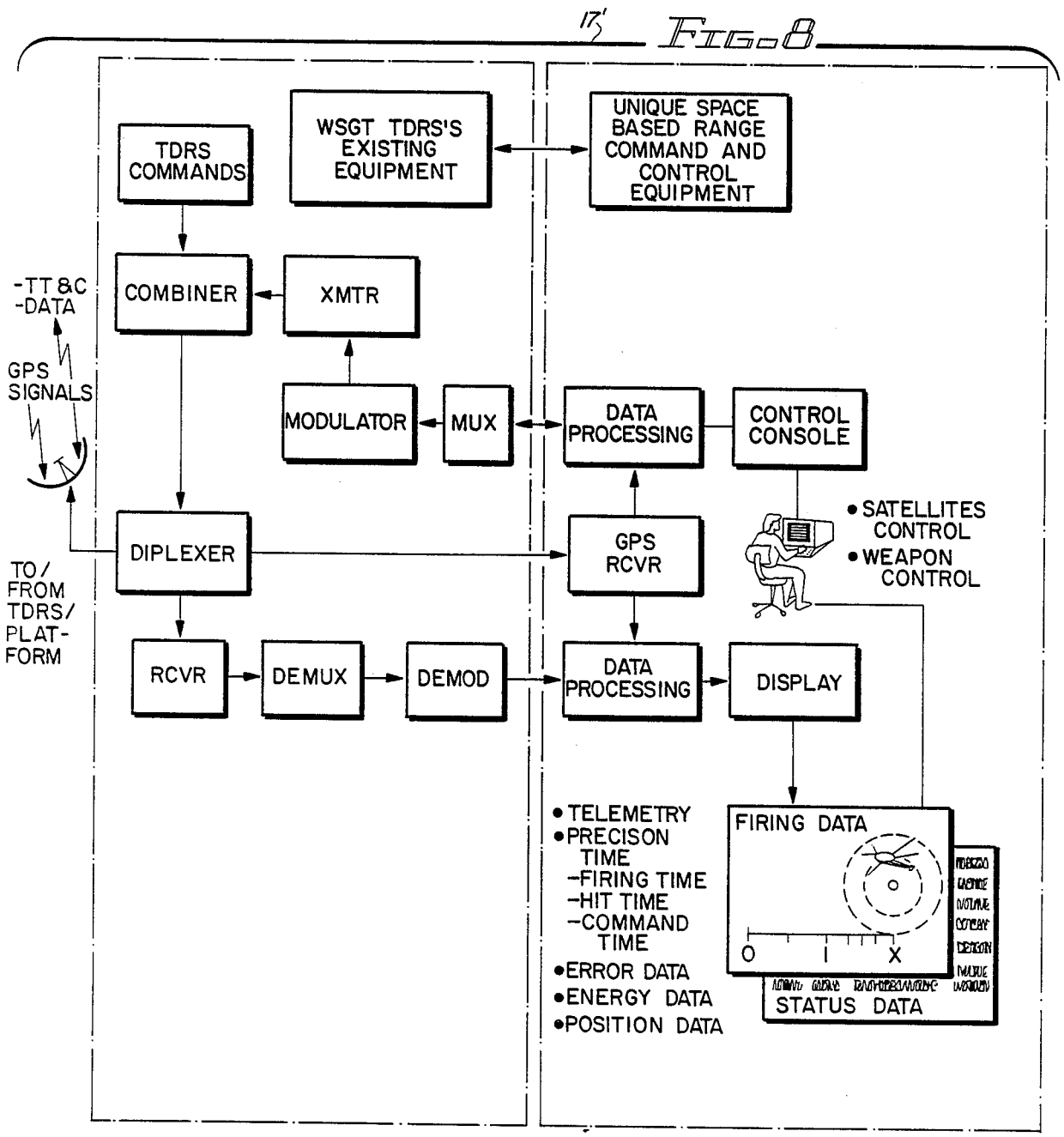
FIG. 8 is a block diagram illustrating the components and configuration of the ground terminal of the system of FIG. 1.

FIG. 8 is a simplified block diagram of the existing Ground Terminal Equipment. This equipment transmits and receives data to and from the TDRS for processing, receives GPS signals for ephemeris determination and improved positional accuracy and data processing.

OPERATIONAL SUMMARY

The following describes a typical scenario for testing an exemplary weapon system.

Referring to FIG. 1, a space test scenario can be deployed as follows. Using a neutral particle beam (NPB) as a typical weapon to be tested in space, the test article, an experimental prototype is mounted on a space platform and launched into space using the Shuttle STS, or an expandable launch vehicle. The target satellites and instrumented satellites are configured for the test and measurement parameters and launched into space in a like manner. For this scenario, the target satellites can be covered with various materials to be bombarded with the NPB. The instrumented vehicles can be implemented with gamma detection devices to measure the effects of the impinging NPB upon the target vehicle's material coating.

All of the involved space assets in this example are controlled by a ground terminal operating through a geo sync satellite to each test element. The spacing of these assets relative to each other is determined by the GPS constellation R.F. link to each test element.

Now the test can be performed by commanding the weapon platform to point and fire at the target vehicle. The impinging beam effects can be measured by the satellites carrying the gamma detectors. The data is collected, stored and forwarded to the ground terminal by command via either a direct link or through the geo sync satellite.

Having disclosed my invention in such terms as to enable those skilled in the art to understand and practice it and having identified the presently preferred embodiment thereof, I claim:

1. A system for testing weapons in space comprising:
   a weapons platform, including
      means for carrying a space weapon, and
      housekeepiing subsystems, including
         a propulsion subsystem to control the orientation of the platform relative to the target,
         a support power subsystem to power the weapon to be tested,
         a communication subsystem to report back platform subsystem status and to process received information,
         a command subsystem to provide commands for the weapons platform to cooperate with the target, and
         a positioning/pointing subsystem to determine the platform's attitude;
   a target, including
      means for positioning said target in space remote from said weapons platform,
      damage assessment sensors to measure the effectiveness of the test being performed,
      means for communicating
         damage assessment data, and
         selectably, target position data, and
      positioning/pointing means to determine the attitude and pointing of the targets;
   a weapon/target position determination system, including means, in a first mode of operation, for determining the positions of said weapons platform and said target using target position data supplied by said target communcations system and, in a second mode of operation, for determining said weapons platform and target positions independently of said supplied target position data;
   a test control/assessment system including
      means for processing weapon status data, target status data and weapon/target position data,
      means for generating command signals including position, pointing, energy and timing signals,
      means for generating weapon-effectiveness data and for displaying and assessing such data; and
   a data communication system, including
      means for receiving data transmitted by said weapons platform and target communcations substystems and relaying said data to said test control/assessment system, and
      means for receiving command signals from said test control/assessment system and relaying said commands to said weapons platform.

* * * * *